Dec. 25, 1928.
O. R. LUDWIG
1,696,854
CORN VENTILATING AND DRYING DEVICE
Filed Oct. 29, 1927
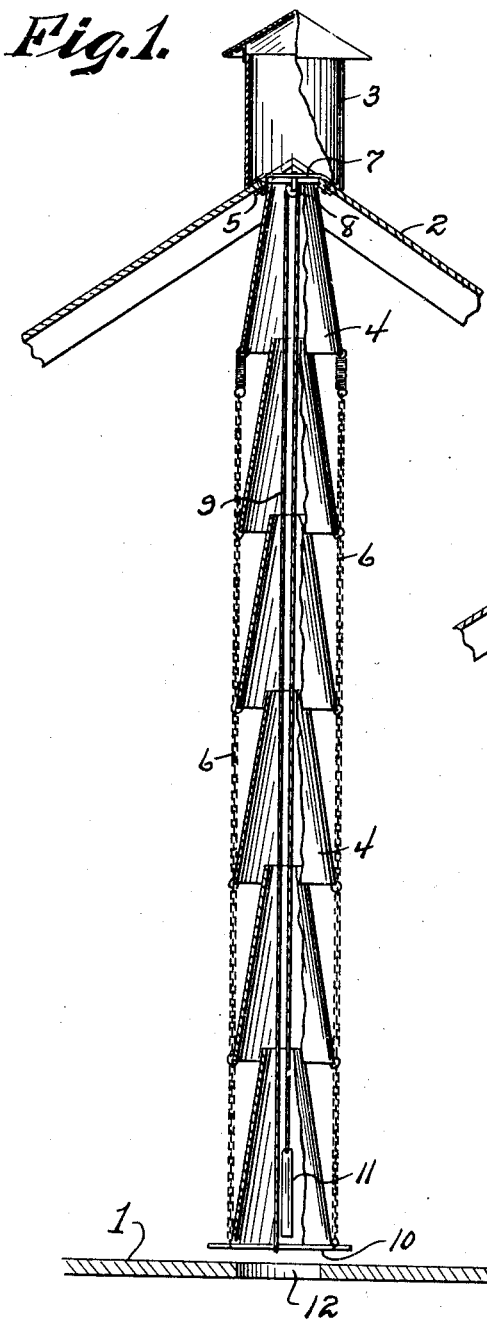
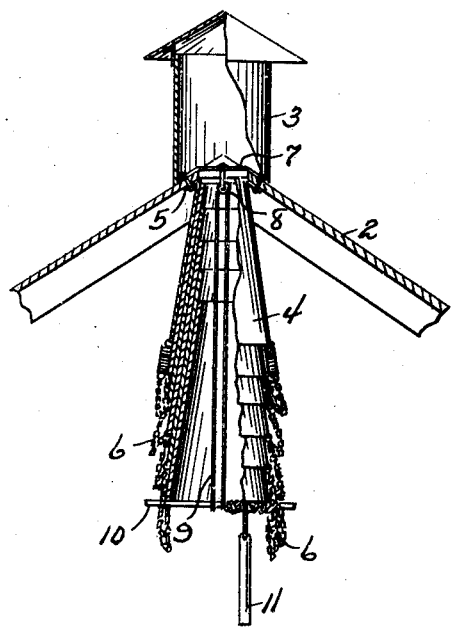
Otto R. Ludwig
INVENTOR
BY Victor J. Evans
ATTORNEY
WITNESS: John Donovan Patented Dec. 25, 1928.

1,696,854

UNITED STATES PATENT OFFICE.

OTTO R. LUDWIG, OF GARVIN, MINNESOTA.

CORN VENTILATING AND DRYING DEVICE.

Application filed October 29, 1927. Serial No. 229,713.

The object of this, my present invention, is the provision of a ventilating means for the storage houses or cribs for grain of a simple construction but which will direct and circulate atmospheric air through the grain and likewise direct heated or foul air from the grain to the atmosphere so that the grain will be thus preserved and thus the liability of spoiling of such grain will be effectively overcome.

A further object is the provision of a ventilating device for this purpose that includes preferably frusto conical pipe sections, the reduced end of one section being received in the widened end of the adjacent section, there being flexible means for associating all of the sections and likewise means for holding the sections extended or telescoped one into the other, the pipe constituting the said sections designed to have its ends arranged in a line with openings in a storage house for grain whereby atmospheric air will enter the storage house, but directed through the pipe sections in a manner to circulate such air throughout the storage house and the grain therein and to likewise serve as a conductor for foul air from such storage house and thereby insure the preservation of the grain in such storage house.

To the attainment of the foregoing the invention consists in the improvement as hereinafter described and definitely claimed.

In the drawings:

Figure 1 is a longitudinal sectional view through my improved ventilator showing the same in operative and applied position.

Figure 2 is a similar view but showing the sections of the ventilator telescoped one into the other and sustained so associated as when the device is not required for use.

In Figures 1 and 2 of the drawings, I have illustrated only a fragmentary part of a grain storage house or cradle. The floor of the storage house is indicated by the numeral 1, the same being elevated above the ground surface in the usual manner, and the peaked top by the numeral 2. The top 2 at the peak thereof is formed with the usual foul air outlet and ventilator 3 which, of course, surrounds an opening in the said top. In the showing of the drawings, my improved ventilator for preserving grain in the storage house comprises a number of frusto conical pipes 4. One of these pipes has its reduced end formed with laterally extending ears 5 which are bolted or otherwise secured to the roof 2 and the mouth of this pipe section is received through the opening in the said roof. The widened ends of each of the pipe sections are connected together through the medium of flexible elements 6 which may be either in the nature of chains or cables.

Supported through the medium of a bar or plate 7 that is disposed over an opening in the mouth of the upper pipe section 4 there is a sheave wheel 8 and trained around this sheave wheel there is a cable 9. The flexible elements on the lower or outer ventilator pipe sections 4 are preferably connected to a rod 10 and also connected to this rod there is one end of a cable 9. On the second end of this cable 9 there is a counter balancing weight 11.

The floor 1 of the grain storage house is provided with an opening 12 that is disposed in a line with the bore of my improved ventilator. The ventilator is shown in operative use by Figure 1 of the drawings. By reference to this figure it will be seen that the lower or outer frusto conical pipe section of the ventilator is disposed a suitable distance above the floor and in a line with the opening 12. The atmospheric air will flow through the pipe section through the ventilator. Because of the shape of the ventilator sections this air will be directed through the narrow ends or mouths thereof into the widened ends of the adjacent section. The air will be deflected in its passage through the system so that the air will circulate through the widened ends of the sections and around the grain that is stored in the storage house, thus serving to effectively preserve the grain. The foul air will pass through the widened ends of the ventilator sections and find an outlet through the ventilator 3 on the top of the grain storage house.

When the ventliator is not desired for use it is merely necessary to exert a pull upon the weight 11 which will cause the ventilator sections to telescope one into the other and in order to hold the said sections thus associated the end of the cable 9 to which the weight 11 is attached is wound around the bar 10.

The foregoing description and the drawings merely illustrate one satisfactory embodiment of my improvement and obviously I do not wish to be restricted to the precise construction of parts as therein set forth.

The sections comprising the ventilator may be formed of reticulated material or wire mesh. The pipes or tubes may be of any desired size, shape and form and these and other changes may be made providing, of caurse, such changes do not depart from the spirit of the invention or exceed the scope thereof as expressed by the appended claim.

Having described the invention, I claim:

A ventilator for grain storage houses, comprising a plurality of pipe members which are gradually widened from one to their other ends and the reduced end of each of the pipe members designed to be received in the widened end of the adjacent pipe members, one of said pipe members having outstanding ears thereon for the reception of elements for securing this member to the top of the house, oppositely arranged flexible elements connected to the widened ends of the pipe members, and a rod on the outer edge of the lower pipe member to which the lower flexible elements are secured, all of said flexible elements being of the same length, whereby when extended the said elements will sustain the reduced ends of the pipes in the widened ends of the adjacent pipes, a sheave wheel fixedly supported on the top of the building, a cable trained therearound and having one end surrounding and fixed to the rod and a counterbalancing weight on the second end of the cable whereby a pull on the cable will telescope the pipe members.

In testimony whereof I affix my signature.

OTTO R. LUDWIG.